United States Patent
Yasuda et al.

(10) Patent No.: US 10,921,813 B2
(45) Date of Patent: Feb. 16, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Naoto Yasuda, Wako (JP); Takafumi Hirose, Wako (JP); Nobuyuki Watanabe, Wako (JP); Makoto Nakatsuka, Wako (JP); Yuki Oshitani, Tokyo (JP); Susumu Iwamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/286,711

(22) Filed: Feb. 27, 2019

(65) Prior Publication Data

US 2019/0278278 A1   Sep. 12, 2019

(30) Foreign Application Priority Data

Mar. 9, 2018  (JP) ............................. JP2018-043449

(51) Int. Cl.
  *G05D 1/02*   (2020.01)
  *G05D 1/00*   (2006.01)
  *B60W 30/08*  (2012.01)

(52) U.S. Cl.
  CPC ......... *G05D 1/0214* (2013.01); *G05D 1/0088* (2013.01); *G05D 1/0276* (2013.01); *B60W 30/08* (2013.01); *B60W 2554/00* (2020.02); *G05D 2201/0213* (2013.01)

(58) Field of Classification Search
  CPC .. G05D 1/0214; G05D 1/0088; G05D 1/0276; G05D 2201/0213; B60W 2554/00; B60W 30/08; B60W 2030/082
  USPC .......................................................... 701/24
  See application file for complete search history.

(56) References Cited

U.S. PATENT DOCUMENTS

| 10,540,882 | B2 * | 1/2020 | Stenneth | ............. | G08B 25/006 |
| 2016/0229397 | A1 * | 8/2016 | Muthukumar | ........ | B60W 10/20 |
| 2017/0168502 | A1 * | 6/2017 | Gordon | ................. | B60K 28/14 |
| 2017/0316698 | A1 * | 11/2017 | Stenneth | ............. | G08B 25/007 |

FOREIGN PATENT DOCUMENTS

JP   2017-188127   10/2017

* cited by examiner

*Primary Examiner* — Krishnan Ramesh
(74) *Attorney, Agent, or Firm* — Amin, Turocy & Watson, LLP

(57) ABSTRACT

A vehicle control device (100) includes a recognition unit (130) that is configured to recognize a surrounding situation of a subject vehicle that is able to be automatically driven, and a control unit (120, 160) that is configured to perform a predetermined operation with respect to a cause of obstruction to traffic of a traffic participant due to a predetermined contact of the subject vehicle in a case that the recognition unit recognizes that the predetermined contact of the subject vehicle has occurred, and the control unit differentiates an operation that is executed in a case that it is recognized that an occupant is not onboard the subject vehicle from an operation that is executed in a case that it is recognized that the occupant is onboard the subject vehicle.

6 Claims, 8 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-043449, filed Mar. 9, 2018, the content of which is incorporated herein by reference.

BACKGROUND

Field of the Invention

The present invention relates to a vehicle control device, a vehicle control method, and a storage medium.

Description of Related Art

In recent years, research on automatic vehicle control has been proceeding. In relation thereto, a technology for detecting a physical abnormality of a driver of a vehicle, and switching the vehicle to a normal automated driving mode or a forced automated driving mode to cause the vehicle to travel has been disclosed (for example, Japanese Unexamined Patent Application, First Publication No. 2017-188127).

SUMMARY

However, in the related art, suitable control according to the presence or absence of an occupant may not be able to be performed in a case that contact with a vehicle has occurred in some cases.

The present invention has been made in consideration of such circumstances, and an object of the present invention is to provide a vehicle control device, a vehicle control method, and a storage medium in which suitable control according to the presence or absence of an occupant can be performed in a case that an accident occurs during traveling.

A vehicle control device, a vehicle control method, and a storage medium according to the present invention adopt the following configuration.

(1): A vehicle control device according to an aspect of the present invention includes: a recognition unit that is configured to recognize a surrounding situation of a subject vehicle that is able to be automatically driven; and a control unit that performs a predetermined operation with respect to a cause of obstruction to traffic of a traffic participant due to a predetermined contact of the subject vehicle in a case that the recognition unit recognizes that predetermined contact of the subject vehicle has occurred, wherein the control unit differentiates an operation that is executed in a case that it is recognized that an occupant is not onboard the subject vehicle from an operation that is executed in a case that it is recognized that an occupant is onboard the subject vehicle.

(2): In the aspect (1), the vehicle control device further includes a notification unit that is configured to notifie information externally from the subject vehicle, wherein the control unit causes the notification unit to notify of information for requesting removal of the factor on the basis of the surrounding situation recognized by the recognition unit.

(3): In the aspect (2), the control unit is configured to cause the notification unit to send a notification to a predetermined agency in a case that it is recognized by the recognition unit that there are few people present around the subject vehicle, causes the notification unit to send a notification to the predetermined agency in a case that it is recognized by the recognition unit that there are many people present around the subject vehicle, and causes the notification unit to notify the outside of the subject vehicle of information for requesting removal of the factor.

(4): In the aspect (2), the notification unit is configured to include a display unit, and the control unit causes information on the factor to be displayed on the display unit of the notification unit externally from the subject vehicle.

(5): In the aspect (2), the recognition unit is configured to determine whether or not the subject vehicle is able to be self-propelling on the basis of a degree of contact, and the control unit has a function of controlling one or both of steering and the acceleration/deceleration of the subject vehicle, and moves the subject vehicle from a position of a rescue target generated due to the contact to the upstream side of a flow of another vehicle in a case that it is recognized that an occupant is not onboard the subject vehicle and it is determined by the recognition unit that the subject vehicle is able to be self-propelling.

(6): In the aspect (5), the control unit is configured to move the subject vehicle to a position at which the rescue target due to the contact is able to be protected from other vehicles.

(7): A vehicle control method according to another aspect of the present invention is vehicle control method using an in-vehicle computer, including: recognizing, by a vehicle control device, a surrounding situation of a subject vehicle that is able to be automatically driven; performing, by the vehicle control device, a predetermined operation with respect to a cause of obstruction to traffic of a traffic participant due to a predetermined contact of the subject vehicle in a case that it is recognized that the predetermined contact of the subject vehicle has occurred; and differentiating, by the vehicle control device, an operation that is executed in a case that it is recognized that an occupant is not onboard the subject vehicle from an operation that is executed in a case that it is recognized that the occupant is onboard the subject vehicle.

(8): A storage medium according to another aspect of the present invention is a computer-readable non-transient storage medium storing a program, the program causing a vehicle control device to recognize a surrounding situation of a subject vehicle that is able to be automatically driven; perform a predetermined operation with respect to a cause of obstruction to traffic of a traffic participant due to a predetermined contact of the subject vehicle in a case that it is recognized that the predetermined contact of the subject vehicle has occurred; and differentiate an operation that is executed in a case that it is recognized that an occupant is not onboard the subject vehicle from an operation that is executed in a case that it is recognized that an occupant is onboard the subject vehicle.

According to (1) to (8), in a case that an accident occurs during traveling, it is possible to perform suitable control according to the presence or absence of an occupant.

According to (2), it is also possible to provide information on an occurrence of contact externally from the subject vehicle and call attention.

According to (3), it is also possible to perform a notification according to a surrounding environment of the subject vehicle and prompt protection of an occupant or a rescue target.

According to (5) and (6), it is also possible to prevent an occurrence of secondary disasters.

DESCRIPTION OF EMBODIMENTS

Hereinafter, embodiments of a vehicle control device, a vehicle control method, and a storage medium according to the present invention will be described below with reference to the drawings. Hereinafter, a case in which left-hand driving is applied will be described, but the right and the left may be reversed in a case that right-hand driving is applied.

[Overall Configuration]

Figure 1:
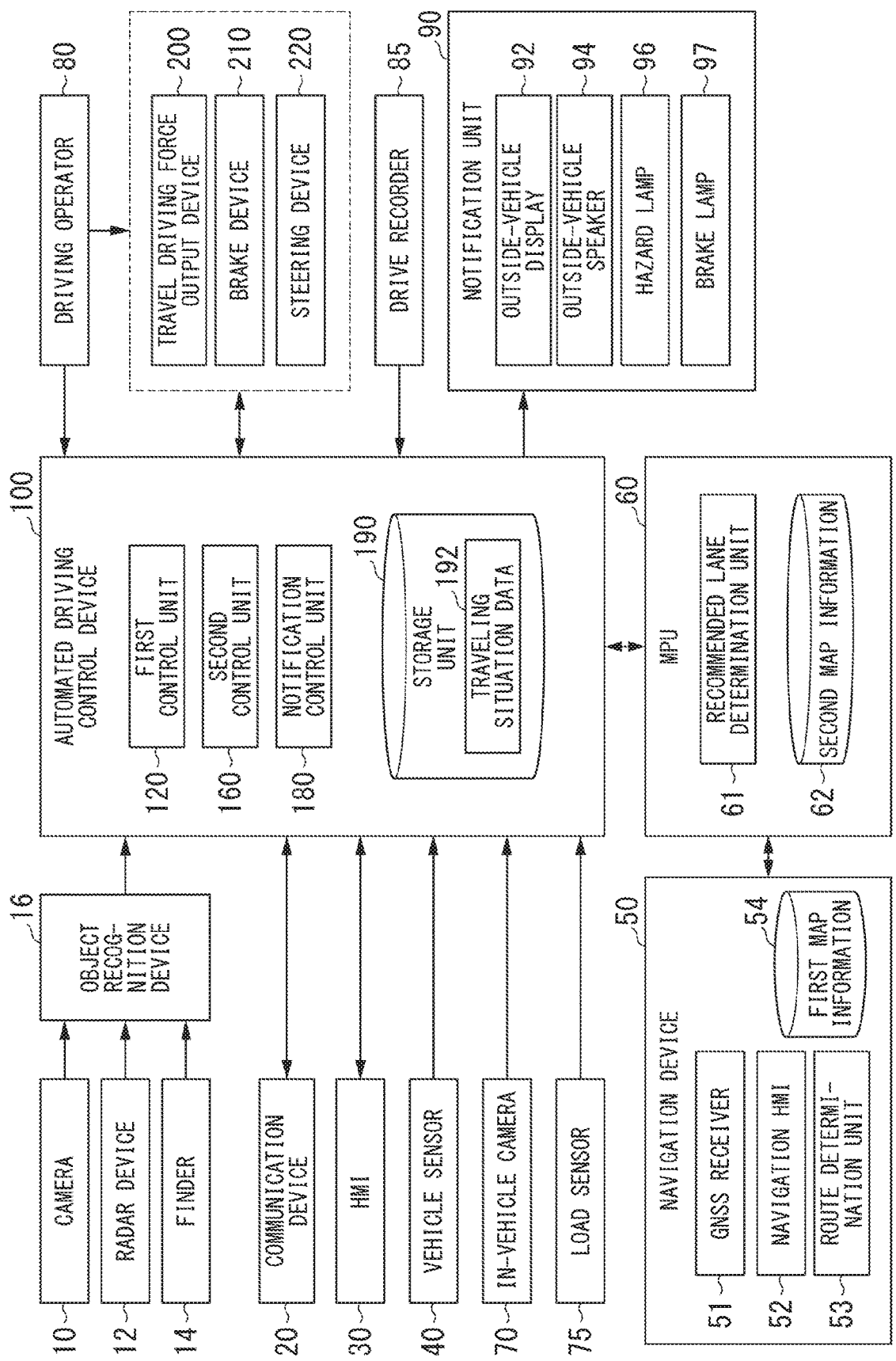
FIG. 1 is a configuration diagram of a vehicle system 1 using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle. A driving source thereof is an internal combustion engine such as a diesel engine or a gasoline engine, an electric motor, or a combination thereof. The electric motor operates using power generated by a power generator connected to the internal combustion engine, or discharge power of a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These units or devices are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to any place on the vehicle in which the vehicle system 1 is mounted (hereinafter referred to as a subject vehicle M). In the case of forward imaging, the camera 10 is attached to an upper portion of a front windshield, a rear surface of a rearview mirror, or the like. The camera 10, for example, periodically repeatedly images surroundings of the subject vehicle M. The camera 10 may be a stereo camera.

The radar device 12 radiates radio waves such as millimeter waves to the surroundings of the subject vehicle M and detects radio waves (reflected waves) reflected by an object to detect at least a position of (a distance to and orientation of) the object. The radar device 12 is attached to any place on the subject vehicle M. The radar device 12 may detect a position and a speed of the object using a frequency modulated continuous wave (FM-CW) scheme.

The finder 14 is a light detection and ranging (LIDAR). The finder 14 radiates light to the vicinity of the subject vehicle M and measures scattered light. The finder 14 detects a distance to a target on the basis of a time from light emission to light reception. The radiated light is, for example, pulsed laser light. The finder 14 is attached to any place on the subject vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, or the finder 14 to the automated driving control device 100 as they are. The object recognition device 16 may be omitted from the vehicle system 1.

The communication device 20, for example, communicates with another vehicle that is present around the subject vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the subject vehicle M and receives an input operation from the occupant. The HMI 30 includes various display devices, speakers, buzzers, touch panels, switches, keys, and the like.

The vehicle sensor 40 includes, for example, a vehicle speed sensor that detects a speed of the subject vehicle M, an acceleration sensor that detects an acceleration, a yaw rate sensor that detects an angular speed around a vertical axis, and an orientation sensor that detects a direction of the subject vehicle M.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies a position of the subject vehicle M on the basis of a signal received from a GNSS satellite. The position of the subject vehicle M may be specified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. The route determination unit 53, for example, determines a route (hereinafter, an on-map route) from the position of the subject vehicle M (or any input position) specified by the GNSS receiver 51 to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determination unit 61, and holds second map information 62 in a storage device such as an HDD or a flash memory. The recommended lane determination unit 61 divides the on-map route provided from the navigation device 50 into a plurality of blocks (for example, divides the route every 100 [m] in a progression direction of the vehicle), and determines a recommended lane for each block by referring to the second map information 62. The recommended lane determination unit 61 determines in which lane from the left the subject vehicle M travels. The recommended lane determination unit 61 determines the recommended lane so that the subject vehicle M can travel on a reasonable route for progression to a branch destination in a case that there is a branch place in the on-map route.

The second map information 62 is map information with higher accuracy than the first map information 54. The second map information 62 includes, for example, information on a center of the lane or information on a boundary of the lane. The second map information 62 may include road information, traffic regulation information, address information (an address and postal code), facility information, telephone number information, and the like. The second map information 62 may be updated at any time by the communication device 20 communicating with another device.

The in-vehicle camera 70, for example, images a cabin of the subject vehicle M. For example, the in-vehicle camera 70 performs imaging so that an area near each seat in the cabin on which the occupant is seated is included within an angle of view. The in-vehicle camera 70 is a digital camera using a solid-state imaging element such as a CCD or a CMOS. The in-vehicle camera 70, for example, images the cabin of the subject vehicle M periodically and outputs captured images to the automated driving control device 100.

The load sensor 75 detects a load applied to each seat in the cabin and outputs detected results to the automated driving control device 100.

The driving operator 80 includes, for example, an accelerator pedal, a brake pedal, a shift lever, a steering wheel, a modified steering wheel, a joystick, and other operators. A sensor that detects the amount of operation or the presence or absence of the operation is attached to the driving operator 80, and a result of the detection is output to some or all of the automated driving control device 100, the travel driving force output device 200, the brake device 210, and the steering device 220.

In a case that an abnormal behavior such as sudden acceleration and deceleration or sudden steering of the subject vehicle M, or contact with an object is detected, the drive recorder 85 stores am image for a predetermined time (for example, about 15 to 60 seconds) before and after the abnormal behavior, which is captured by the camera 10, as traveling situation data 192 in the storage unit 190, in association with information detected by the vehicle sensor 40 before and after detection of the abnormal behavior, date and time information, position information of the subject vehicle M, and the like.

The outside-vehicle notification unit 90 includes, for example, an outside-vehicle display 92, an outside-vehicle speaker 94, a hazard lamp 96, and a brake lamp 97. The outside-vehicle display 92 is, for example, a light transmission type liquid crystal panel formed in at least a part of a front wind shield, a side wind shield, or a rear wind shield of the subject vehicle M. The outside-vehicle display 92 may be, for example, an organic electro luminescence (EL) display that is adhered on a surface of a body portion on the outer side of the subject vehicle M. The outside-vehicle display 92 may be a liquid crystal display (LCD) fitted in the body portion or may be a display panel that serves as a part or the whole of the body portion. The outside-vehicle display 92, for example, displays a predetermined image or animation image under the control of the notification control unit 180. The outside-vehicle display 92 is an example of a "display unit".

The outside-vehicle speaker 94 outputs, for example, a predetermined sound to surroundings of the subject vehicle M under the control of the notification control unit 180. The hazard lamp 96, for example, causes lamps disposed in the front, rear, left and right of the body portion of the subject vehicle M to blink under control of the notification control unit 180 or a switch operation of an occupant. The brake lamp 97 is lit in conjunction with an operation of the brake pedal in a state in which normal driving is performed, and notifies surroundings of the subject vehicle M of an operation of the brake device 210. For example, in a case that the hazard lamp 96 does not operate, the brake lamp 97 performs a blinking display under the control of the notification control unit 180 and is used as a substitute for the hazard lamp 96. A combination of the communication device 20 and the outside-vehicle notification unit 90 is an example of the "notification unit".

The automated driving control device 100 includes, for example, a first control unit 120, and a second control unit 160. The first control unit 120 and the second control unit 160 are realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device such as an HDD or a flash memory of the automated driving control device 100 in advance or may be stored in a removable storage medium such as a DVD or a CD-ROM and the storage medium may be mounted in a drive device so that the program may be installed in the HDD or the flash memory of the automated driving control device 100. A combination of the action plan generation unit 140, the second control unit 160, and the notification control unit 180 is an example of the "driving control unit". The driving control unit, for example, controls one or both of steering and acceleration/deceleration of the subject vehicle M on the basis of the surrounding situation recognized by the recognition unit 130 to execute driving control.

Figure 2:
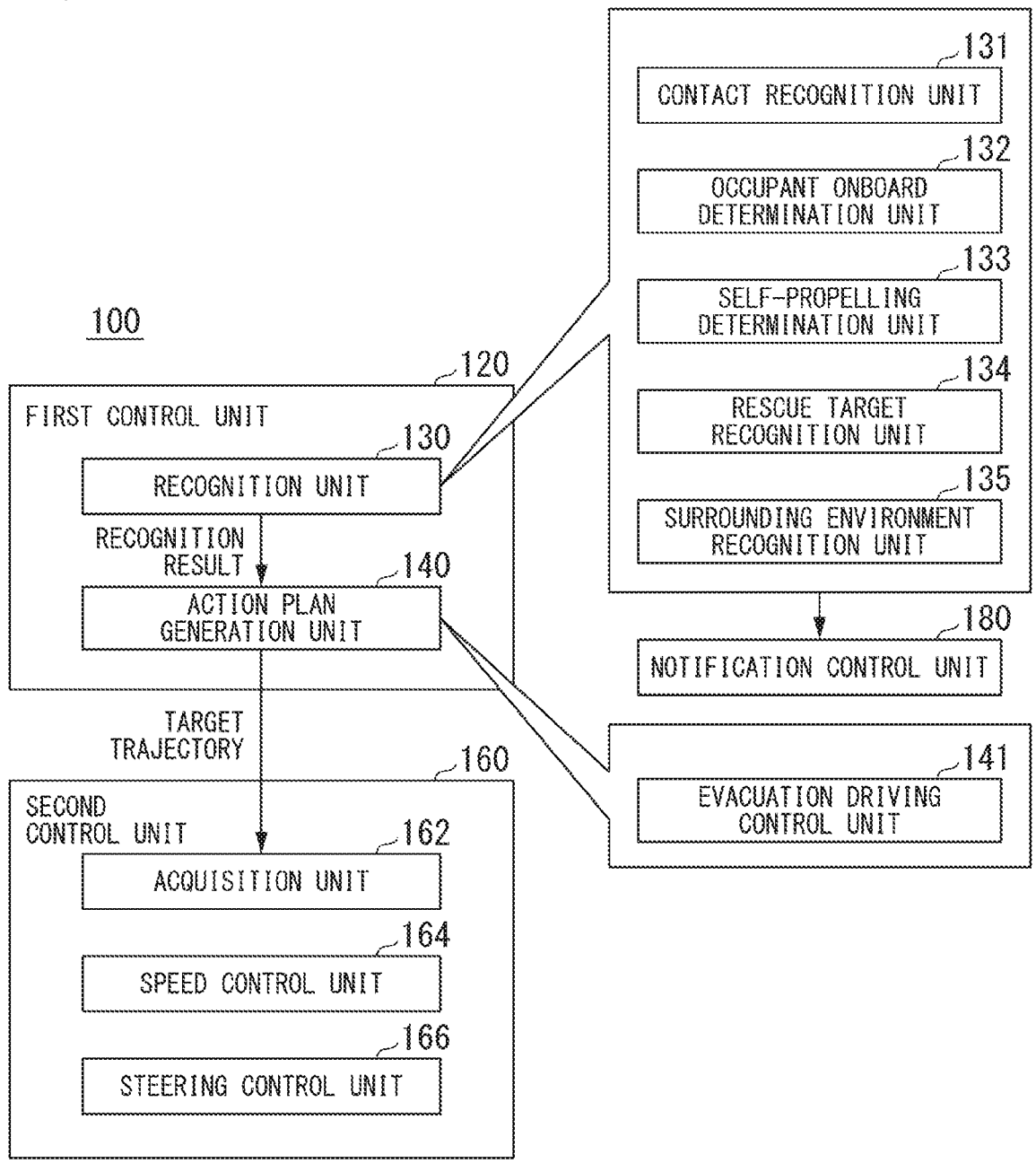
FIG. 2 is a functional configuration diagram of a first control unit 120, a second control unit 160, and a notification control unit 180.

FIG. 2 is a functional configuration diagram of the first control unit 120, the second control unit 160, and the notification control unit 180. The first control unit 120 includes, for example, a recognition unit 130 and an action plan generation unit 140. The recognition unit 130 includes, for example, a contact recognition unit 131, an occupant onboard determination unit 132, a self-propelling determination unit 133, a rescue target recognition unit 134, and a surrounding environment recognition unit 135. The action plan generation unit 140 includes, for example, an evacuation driving control unit 141.

The first control unit 120 realizes, for example, a function based on artificial intelligence (AI) and a function based on a previously given model in parallel. For example, in a function of "recognizing an intersection," recognition of the intersection using deep learning or the like and recognition based on previously given conditions (a signal which can be subjected to pattern matching, a road sign, or the like) are executed in parallel, and the function of recognizing an intersection is realized by scoring both recognitions and comprehensively evaluating the recognitions. Accordingly, the reliability of automated driving is guaranteed.

The recognition unit 130 recognizes a state such as a position, direction, speed or acceleration of an object near the subject vehicle M on the basis of information input from the camera 10, the radar device 12, and the finder 14 via the object recognition device 16. The position of the object, for example, is recognized as a position at absolute coordinates with a representative point (a centroid, a drive shaft center, or the like) of the subject vehicle M as an origin, and is used for control. The position of the object may be represented by a representative point such as a centroid or a corner of the object or may be represented by a represented area. The "state" of the object may include an acceleration or jerk of the object, or an "action state" (for example, whether or not the object is changing lanes or is about to change lanes).

The recognition unit 130 recognizes, for example, a lane (traveling lane) in which the subject vehicle M is traveling. For example, the recognition unit 130 compares a pattern of a road marking line (for example, an arrangement of a solid line and a broken line) obtained from the second map information 62 with a pattern of a road marking line near the subject vehicle M recognized from the image captured by the camera 10 to recognize the traveling lane. The recognition unit 130 may recognize not only the road marking lines but also a traveling road boundary (a road boundary) including the road marking line, a road shoulder, a curb, a median strip, a guard rail, or the like to recognize the traveling lane. In this recognition, the position of the subject vehicle M acquired from the navigation device 50 or a processing result of an INS may be additionally taken into account. The recognition unit 130 recognizes a sidewalk, a temporary stop line, an obstacle, a traffic light, a toll gate, a road structure, and other road events.

The recognition unit 130 recognizes a position or a posture of the subject vehicle M relative to the traveling lane in a case that recognizing the traveling lane. The recognition unit 130 may recognize, for example, a deviation of a reference point of the subject vehicle M from a center of the lane, and an angle formed between a progression direction of the subject vehicle M and a line connecting a center of the lane as a relative position and a posture of the subject vehicle M with respect to the traveling lane. Instead, the recognition unit 130 may recognize, for example, a position of the reference point of the subject vehicle M with respect to any one of side end portions (the road marking line or the road boundary) of the traveling lane as the relative position of the subject vehicle M with respect to the traveling lane.

In principle, the action plan generation unit 140 generates a target trajectory along which the subject vehicle M will travel in the future automatically (independently of an operation of a driver) so that the subject vehicle M can travel on the recommended lane determined by the recommended lane determination unit 61 and cope with a surrounding situation of the subject vehicle M. The target trajectory includes, for example, a speed element. For example, the target trajectory is represented as a sequence of points (trajectory points) to be reached by the subject vehicle M. The trajectory point is a point that the subject vehicle M is to reach for each predetermined travel distance (for example, several meters) at a road distance, and a target speed and a target acceleration at every predetermined sampling time (for example, several tenths of a [sec]) are separately generated as part of the target trajectory. The trajectory point may be a position that the subject vehicle M is to reach at the sampling time at every predetermined sampling time. In this case, information on the target speed or the target acceleration is represented by the interval between the trajectory points.

In a case that the action plan generation unit 140 generates the target trajectory, the action plan generation unit 140 may set an event of automated driving. Examples of the automated driving event include a constant speed traveling event, a low speed following driving event, a lane changing event, a branching event, a merging event, and a takeover event. The action plan generation unit 140 generates a target trajectory according to an activated event. The functions of the evacuation driving control unit 141 of the action plan generation unit 140 will be described below.

The second control unit 160 controls the travel driving force output device 200, the brake device 210, and the steering device 220 so that the subject vehicle M passes through the target trajectory generated by the action plan generation unit 140 at a scheduled time.

The second control unit 160 includes, for example, an acquisition unit 162, a speed control unit 164, and a steering control unit 166. The acquisition unit 162 acquires information on the target trajectory (trajectory points) generated by the action plan generation unit 140 and stores the information on the target trajectory in a memory (not illustrated). The speed control unit 164 controls the travel driving force output device 200 or the brake device 210 on the basis of the speed element incidental to the target trajectory stored in the memory. The steering control unit 166 controls the steering device 220 according to a degree of bend of the target trajectory stored in the memory. Processes of the speed control unit 164 and the steering control unit 166 are realized by, for example, a combination of feedforward control and feedback control. For example, the steering control unit 166 executes a combination of feedforward control according to a curvature of a road in front of the subject vehicle M and feedback control based on a deviation from the target trajectory.

The notification control unit 180 notifies the outside of the vehicle of predetermined information using the outside-vehicle notification unit 90 under the control of the occupant onboard determination unit. Examples of the predetermined information include information on a cause of obstruction to traffics of a traffic participant (hereinafter referred to as a traveling hindrance factor) in a road on which the subject vehicle M travels or a road in which the subject vehicle M is scheduled to travel, information for requesting removal of a cause of obstruction to traffics due to contact, information for prompting stop, and information for prompting progress. The traffic participants are, for example, all vehicles including four-wheeled vehicles, two-wheeled vehicles, and light vehicles, and vehicles or persons that pass through a road for pedestrians or the like, sidewalks, or surrounding areas thereof.

Examples of the traveling hindrance factor include a stop on the road due to contact between the subject vehicle M and another vehicle, a stop on the road due to contact between the subject vehicle M and an object other than a vehicle, and a stop on the road due to contact between the subject vehicle M and a pedestrian. Examples of the information for requesting removal of the cause of obstruction to traffics of a traffic participant due to contact include rescue of a rescue target, evacuation of a vehicle of a contact party, and removal of an obstacle. Details of the function of the notification control unit 180 will be described below.

The notification control unit 180 transmits the traveling situation data 192 stored in the storage unit 190 by the drive recorder 85 to a predetermined external device under predetermined conditions. The predetermined external device is, for example, a specific terminal or vehicle possessed by a police station, a fire department, a road service organization, or the like. The notification control unit 180 outputs information such as an image or sound to the outside of the vehicle via the communication device 20 under predetermined conditions and inputs information such as voice from the outside of the vehicle. The notification control unit 180 may send a voice notification to an operator who receives emergency notification under a predetermined condition. The notification control unit 180 may input information from the camera 10, the radar device 12, and the finder 14. Details of a function of the notification control unit 180 will be described below.

The storage unit 190 is realized by, for example, an HDD, a flash memory, an electrically erasable programmable read only memory (EEPROM), a read only memory (ROM), a random access memory (RAM), or the like. The traveling situation data 192 obtained by the drive recorder 85 and other information are stored in the storage unit 190 in addition to a program that the processor reads and executes.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an ECU that controls these. The ECU controls the above configuration according to information input from the second control unit 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second control unit 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder as a backup. The brake device 210 is not limited to the configuration described above and may be an electronically controlled hydraulic brake device that controls the actuator according to information input from the second control unit 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second control unit 160 or information input from the driving operator 80 to change the direction of the steerable wheels.

[Control at Time of Contact]

The evacuation driving control unit 141 performs a predetermined operation with respect to a cause of obstruction to traffic of a traffic participant due to a contact. The evacuation driving control unit 141 is activated when the contact recognition unit 131 recognizes that the subject vehicle M and the object are in contact with each other. The evacuation driving control unit 141 performs a process using recognition results of the occupant onboard determination unit 132, the self-propelling determination unit 133, the rescue target recognition unit 134, and the surrounding environment recognition unit 135.

Figure 3:
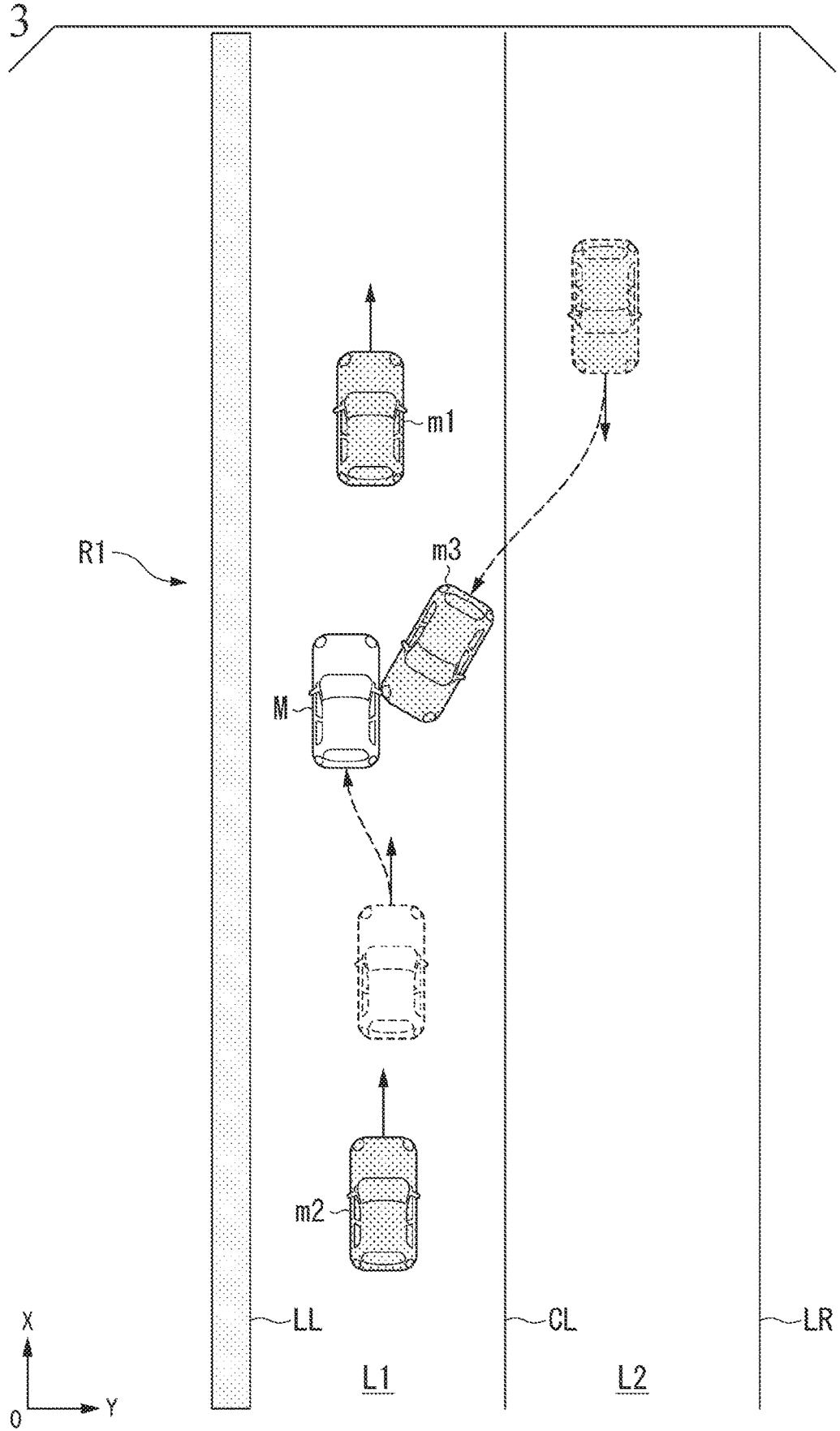
FIG. 3 is a diagram showing an example of a state in which a process of a contact recognition unit 131 is applied.

The contact recognition unit 131 determines whether or not the contact of the subject vehicle M with an object has been recognized. FIG. 3 is a diagram showing an example of a state in which a process of the contact recognition unit 131 is applied. In FIG. 3, a one side one-lane single lane road including a lane L1 partitioned off by road marking lines LL and CL and an opposite lane L2 with respect to the lane L1 partitioned off by the road marking lines CL and LR is shown. It is assumed that the subject vehicle M and nearby vehicles m1 and m2 are traveling in an extending direction of the lane L1 (an X direction in FIG. 3) and a nearby vehicle m3 is traveling on the opposite lane L2.

The subject vehicle M performs contact avoidance control on the recognized object in principle. The contact avoidance control is, for example, control for avoidance of contact between the subject vehicle M and an object in a case that there is an object approaching the subject vehicle M on the basis of the surrounding situation recognized by the recognition unit 130. In the contact avoidance control, one or both of the steering and the acceleration/deceleration of the subject vehicle M are controlled. The contact avoidance control is executed, for example, by an avoidance event set by the action plan generation unit 140. However, according to a relationship between positions of the nearby vehicles m1 and m2 traveling in front of and behind the subject vehicle M and a position on the road, the acceleration and deceleration of the subject vehicle M may be limited and a situation in which the object cannot be avoided using the contact avoidance control may occur.

In FIG. 3, a state in which the nearby vehicle m3 traveling on the opposite lane L2 has entered the lane L1 beyond the road marking line CL and then has come into a contact of the subject vehicle M is shown. The contact recognition unit 131 recognizes that the subject vehicle M has come into contact with the nearby vehicle m3 on the basis of the approach of the nearby vehicle m3 recognized by the recognition unit 130 and a detection result of a contact detection sensor.

The contact recognition unit 131 recognizes, for example, whether or not there is contact with the object on the basis of the detection result of the contact detection sensor of the vehicle sensor 40. As the contact detection sensor, for example, an acceleration sensor that detects an acceleration occurring in the subject vehicle M, a strain gauge that detects a strain occurring in a vehicle body of the subject vehicle M, or the like is used. The contact recognition unit 131 may recognize the contact on the basis of an output value of a sensor of an air bag. The acceleration sensor detects, for example, an acceleration generated in six axis directions of the vehicle body. The strain sensor, for example, is provided at a plurality of places in a cabin of the subject vehicle M and detects a degree of deformation of the cabin.

The strain sensor may detect the degree of deformation in a crushable zone provided in front of and behind the vehicle body. The vehicle sensor 40 outputs sensor values output from the acceleration sensor and the strain sensor to the contact recognition unit 131.

The contact recognition unit 131 recognizes the contact occurring in the subject vehicle M on the basis of recognition results of the recognition unit 130 and output results of the vehicle sensor 40. For example, in a case that the recognition unit 130 recognizes a behavior of an object approaching the subject vehicle M and the value of the acceleration sensor becomes equal to or greater than a threshold value, the contact recognition unit 131 may recognize that the vehicle has come in contact with the object. The object that is a contact target recognized by the recognition unit 130 includes, for example, other vehicles, light vehicles, pedestrians, obstacles, road structures, animals, trees, buildings, and snow masses.

In a case that the contact recognition unit 131 recognizes that the vehicle comes in contact with the object, the contact recognition unit 131 recognizes the degree of deformation of the cabin or the crushable zone on the basis of values of the plurality of strain sensors. For the degree of deformation of the cabin or crushable zone, for example, a deformation level is set according to a predetermined stepwise threshold value. The contact recognition unit 131 may analyze the image captured by the in-vehicle camera 70 and recognize the degree of deformation of the cabin.

In addition, the vehicle sensor 40 may include a contact detection sensor that detects the presence or absence of contact and a strength of contact from the outside, at any position on the body portion of the subject vehicle M. The vehicle sensor 40 may include a vibration sensor that detects vibration of the subject vehicle M or a sound detection sensor that detects sound generated from the subject vehicle M or near the subject vehicle M.

The contact recognition unit 131 estimates a longitudinal acceleration occurring in a longitudinal direction of the vehicle body related to the subject vehicle M or a lateral acceleration occurring in a lateral direction of the vehicle body in advance on the basis of a command value that is used for control of one or both of the steering and the acceleration/deceleration of the subject vehicle M in the driving control unit (the action plan generation unit 140 and the second control unit 160). An estimated value may have a predetermined allowable range. The contact recognition unit 131 may compare an actual longitudinal acceleration or an actual lateral acceleration detected by the vehicle sensor 40 with an estimated value, and recognize that the subject vehicle M has come into contact with an object in a case that there is a difference equal to or greater than a predetermined value.

In a case that the contact recognition unit 131 recognizes that the subject vehicle M has come into contact with the object, the contact recognition unit 131 instructs the notification control unit 180 to send an emergency notification indicating that the subject vehicle M has come in contact with the predetermined external device, via the communication device 20. The notification control unit 180 transmit the traveling situation data 192 stored by the drive recorder 85 to the predetermined external device due to contact with the object according to an instruction from the contact recognition unit 131. Accordingly, the notification control unit 180 can more accurately notify of details before and after the contact and can rapidly provide information to a rescuer or the like.

Figure 4:
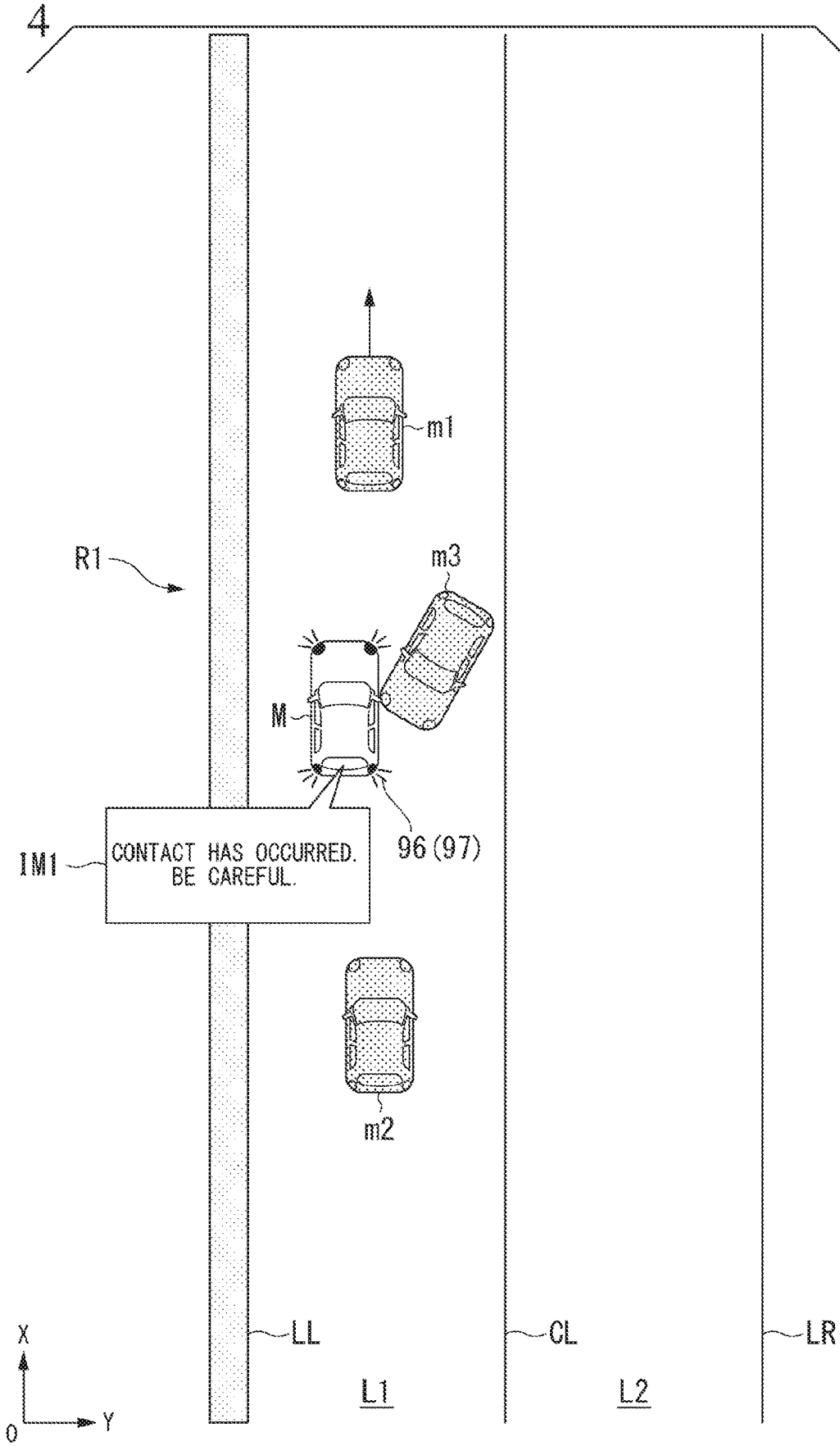
FIG. 4 is a diagram showing a state in which contact with the subject vehicle M occurs.

FIG. 4 is a diagram showing a state in which a contact of the subject vehicle M has occurred. In a case that the contact recognition unit 131 recognizes that the contact has occurred, the contact recognition unit 131 instructs the notification control unit 180 to send a predetermined notification. In a case that the contact recognition unit 131 recognizes that the contact has occurred, the contact recognition unit 131 causes the outside-vehicle display 92 to display a display image IM1 such as "Contact has occurred. Be careful.". In this case, the contact recognition unit 131 may cause the outside-vehicle speaker 83 to perform a notification for calling attention, which indicates that the contact has occurred. In addition thereto, the contact recognition unit 131 may cause the outside-vehicle display 92 to display an image regarding traffic control such as prompting lane change.

In a case that the contact recognition unit 131 recognizes that the contact has occurred, the contact recognition unit 131 instructs the notification control unit 180 to cause the hazard lamp 96 to blink. In a case that it is detected that the hazard lamp 96 does not function due to an influence of the contact, the contact recognition unit 131 causes the brake lamp 97 to blink at predetermined time intervals instead of the hazard lamp, thereby notifying surroundings of the subject vehicle M that an accident has occurred.

In a case that the contact recognition unit 131 recognizes the contact between the subject vehicle M and the nearby vehicle m3, the occupant onboard determination unit 132 determines whether or not an occupant is onboard the subject vehicle M. Specifically, the occupant onboard determination unit 132 first analyzes the image captured by the in-vehicle camera 70 and determines whether feature information of a face or a body (for example, an upper body) is included in the image. The feature information of the face or body can be extracted by, for example, pattern matching based on color or shape, for example.

In a case that the occupant onboard determination unit 132 determines that feature information of a face or body is included in the image, the occupant onboard determination unit 132 determines that the occupant is onboard the subject vehicle M (that is, the subject vehicle M is in a manned state). In a case that the occupant onboard determination unit 132 determines that the feature information of the face or body is not included in the image, the occupant onboard determination unit 132 determines that an occupant is not onboard the subject vehicle M (that is, subject vehicle M is in an unmanned state).

In a case that a load value of at least one of respective seats detected by the load sensor 75 is equal to or greater than a threshold value, the occupant onboard determination unit 132 determines that the occupant is onboard the subject vehicle M. In a case that the load values of all the seats are smaller than the threshold value, the occupant onboard determination unit 132 may determine that no occupants are onboard the subject vehicle M. In a case that the occupant onboard determination unit 132 determines that an occupant is not onboard the subject vehicle M, the occupant onboard determination unit 132 instructs the notification control unit 180 to transmit the traveling situation data 192 to a terminal of an owner or a manager of the subject vehicle M.

For example, in a case that at least one of determination results based on the image captured by the in-vehicle camera 70 and determination results based on the load sensor 75 indicates that the occupant is onboard the subject vehicle M, the occupant onboard determination unit 132 may determine that the subject vehicle M is in the manned state. Thus, the occupant onboard determination unit 132 can suppress an erroneous determination that an occupant is onboard the subject vehicle M in a state in which a package or the like is placed on a seat and improve accuracy of a onboard determination using both of the determination result based on the image captured by the in-vehicle camera 70 and the determination result based on the load sensor.

In a case that the contact recognition unit 131 recognizes the contact with the nearby vehicle m3 and the occupant onboard determination unit 132 determines that the occupant is not onboard the subject vehicle M, the self-propelling determination unit 133 determines whether or not the subject vehicle M can be self-propelling. The self-propelling is, for example, to control one or both of the steering and the acceleration/deceleration and cause the subject vehicle M to travel independently of an operation of the occupant. An example of the self-propelling may include a case in which the subject vehicle M can perform acceleration and deceleration control to move to a predetermined position even in a case that the steering cannot be sufficiently controlled due to the contact with the nearby vehicle m3. Another example of the self-propelling includes a case in which the subject vehicle M is cause to travel according to an inertia of a traveling speed at the time of contact and performs steering control to move to a predetermined position even in a case that steering cannot be sufficiently controlled.

The self-propelling determination unit 133, for example, checks an operation of the sensors, devices, and driving systems necessary for self-propelling, determines that the subject vehicle M can be self-propelling in a case that the sensors, devices, and driving systems operate, and determines that the subject vehicle M cannot be self-propelling in a case that the sensors, devices, and driving systems do not operate.

The self-propelling determination unit 133, for example, may estimate a degree of the contact with the nearby vehicle m3 on the basis of a strength of the contact detected by the contact detection sensor at the time of the contact with the nearby vehicle m3, and determine whether or not the subject vehicle M can be self-propelling. The degree of contact, for example, may be estimated on the basis of the amount of vibration detected by the vibration sensor or a sound volume detected by a sound sensor at the time of the contact with the nearby vehicle m3. In this case, the degree of contact increases in a case that a strength of contact, the amount of vibration, and the sound volume are larger. The self-propelling determination unit 133 determines that the vehicle can be self-propelling in a case that the estimated degree of contact is lower than a threshold value, and determines that the vehicle cannot be self-propelling in a case that the estimated degree of contact is equal to or higher than the threshold value.

The self-propelling determination unit 133 may estimate a degree of damage occurring in the subject vehicle M due to the contact with the nearby vehicle m3 and determine whether or not the subject vehicle can be self-propelling on the basis of the estimated degree of damage. In this case, the self-propelling determination unit 133, for example, increases the degree of damage in a case that the amount of change in the lateral acceleration or the longitudinal acceleration before and after the contact with the nearby vehicle m3 becomes larger. In a case that a vibration equal to or greater than a threshold value is detected by the vibration sensor of the vehicle sensor 40 or in a case that the amount of sound equal to or greater than a threshold value is detected by the sound sensor after the contact with the nearby vehicle m3, the self-propelling determination unit 133 may increase the degree of damage as compared with the vibration or the amount of sound is not detected.

The self-propelling determination unit 133 may increase the degree of damage on the basis of a magnitude of the vibration detected by the vibration sensor or a magnitude of the sound detected by the sound sensor. The self-propelling determination unit 133 may estimate the degree of damage on the basis of a position or angle of the contact with the nearby vehicle m3. In addition, the self-propelling determination unit 133 may estimate the degree of damage according to a degree of deformation of the cabin or crushable zone recognized by the contact recognition unit 131.

In a case that inter-vehicle communication with the nearby vehicle m1 or m2 other than the nearby vehicle m3 can be performed via the communication device 20, the self-propelling determination unit 133 may cause a camera mounted in the nearby vehicle m1 or m2 to image the subject vehicle M, acquire a captured image, analyze the acquired image, and estimate the degree of damage of the subject vehicle M from a dent state or scratches of the exterior obtained as analysis results. The self-propelling determination unit 133 determines that the subject vehicle M can be self-propelling in a case that the degree of damage is lower than the threshold value, and determines that the subject vehicle M cannot be self-propelling in a case that the degree of damage is equal to or higher than the threshold value.

For example, in a case that control for evacuating the subject vehicle M to a predetermined position is performed by the evacuation driving control unit 141 to be described below, the self-propelling determination unit 133 may determine that the subject vehicle M cannot be self-propelling in a case in which the subject vehicle M cannot travel along the target trajectory.

In a case that it is determined that the subject vehicle M cannot be self-propelling, the self-propelling determination unit 133 may cause a power supply of the subject vehicle M to enter an OFF state. Causing the power supply of the subject vehicle M to enter an OFF state is, for example, to turn off a power supply of which a current value supplied to each driving unit for traveling of the subject vehicle M is large.

In this case, the self-propelling determination unit 133 maintains power supplies of devices necessary for protection of occupants, such as the camera 10, the radar device 12, the finder 14, the object recognition device 16, the communication device 20, the HMI 30, the in-vehicle camera 70, and an occupant protection device in an ON state. Accordingly, the subject vehicle M maintains functions such as surroundings monitoring, vehicle cabin monitoring, and communication with the outside in an operable state, and maintains a function of transferring a surrounding situation and a cabin situation to an external institution. Further, the subject vehicle M keeps the occupant protection device functioning and secures a function of protecting the occupant in a case that secondary disasters occurs.

The rescue target recognition unit 134 recognizes a rescue target such as an injured person due to contact. In a case that the contact recognition unit 131 recognizes that contact has occurred, the rescue target recognition unit 134 determines whether or not there is a rescue target among occupants.

For example, when the occupant onboard determination unit 132 determines that the occupant is onboard the subject vehicle M, the rescue target recognition unit 134 determines whether or not there is a rescue target among occupants according to the degree of contact estimated by the self-propelling determination unit 133. In a case that the degree of contact becomes equal to or greater than a predetermined threshold value, the rescue target recognition unit 134 determines that there is a rescue target among the occupants. The rescue target recognition unit 134 may determine whether or not there is a rescue target among the occupants according to the degree of damage estimated by the self-propelling determination unit 133.

For example, in a case that the occupant onboard determination unit 132 determines that the occupant is onboard the subject vehicle M, the rescue target recognition unit 134 may analyze an image of the cabin captured by the in-vehicle camera 70 and determine a state of the occupant. The rescue target recognition unit 134 determines, for example, that there is a rescue target among the occupants in a case that it is recognized that a motion of the occupant is small after the contact occurs or in a case that an injury or the like of the occupant is recognized.

The rescue target recognition unit 134 may analyze the voice acquired from a microphone of the HMI 30 after the contact has occurred, and determine that there is the rescuer as an occupant in a case that the rescue target recognition unit recognizes moaning voice of the occupant or voice requesting rescue. The rescue target recognition unit 134 may cause a notification for confirming safety of the occupant to be sent from the HMI 30 after the contact has occurred.

In a case that the contact recognition unit 131 has recognized that the contact has occurred, the rescue target recognition unit 134 determines whether or not there is a rescue target other than the occupant of the subject vehicle M. For example, in a case that the recognition unit 130 recognizes that the contact target is a pedestrian, a light vehicle, or a two-wheeled vehicle, the rescue target recognition unit 134 determines that there is a rescue target other than the occupant.

In a case that the contact recognition unit 131 recognizes that a contact has occurred and the recognition unit 130 recognizes that the contact target is another vehicle, the rescue target recognition unit 134 determines whether or not there is a rescue target other than the occupant of the subject vehicle M.

The rescue target recognition unit 134, for example, determines whether there is a rescue target other than the occupant on the basis of the degree of contact or the degree of damage estimated by the self-propelling determination unit 133. The rescue target recognition unit 134, for example, compares the degree of contact or the degree of damage estimated by the self-propelling determination unit 133 with a predetermined threshold value, and determines that there is a rescue target other than the occupant in a case that the degree of contact or the degree of damage is equal to or greater than the threshold value. The rescue target recognition unit 134 may determine that there is a rescue target in a case that the rescue target is recognized on the road or inside another vehicle m on the basis of recognition results of the image captured by the camera 10. The rescue target recognition unit 134 may recognize the rescue target who has come in contact with the other vehicle m, on the basis of the recognition result of the image captured by the camera 10.

In a case that the rescue target recognition unit 134 determines that there are the occupant of the subject vehicle M and the rescue target other than the occupant, the rescue target recognition unit 134 instructs the notification control unit 180 to perform a notification for requesting an emergency vehicle such as an ambulance of a predetermined agency such as a fire department or a police station.

In a case that the contact of the subject vehicle M has occurred, the surrounding environment recognition unit 135 determines whether or not the position of the subject vehicle M is a region in which there is a person in the vicinity, and sends a predetermined notification to the outside-vehicle notification unit 90 according to a result of the determination. On the basis of the recognized surrounding situation, the surrounding environment recognition unit 135 instructs the notification control unit 180 to cause the outside-vehicle notification unit 90 to notify information for requesting removal of a factor of hindrance to traffics of a traffic participant due to the contact. The information for requesting removal of a factor of hindrance to traffics of a traffic participant, such as rescue of a rescue target, evacuation of a vehicle of a contact party, and removal of an obstacle, is displayed on the outside-vehicle display 92, and voice messages thereof are output from the outside-vehicle speaker 94.

The surrounding environment recognition unit 135, for example, refers to the second map information 62 on the basis of the position information of the subject vehicle M acquired from the navigation device 50 and determines whether or not there are many people around the subject vehicle M.

Figure 5:
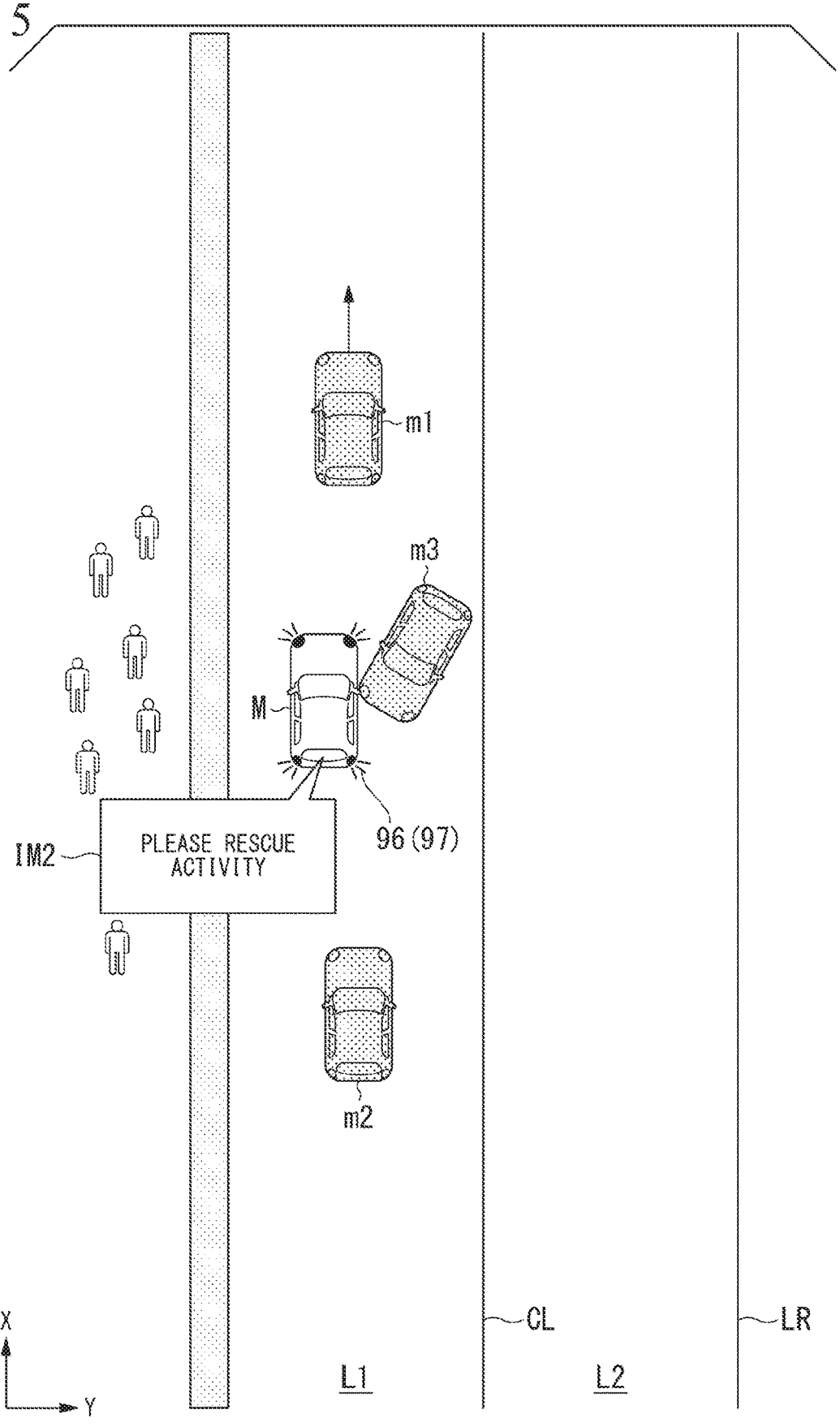
FIG. 5 is a diagram showing an example of a state in which information is displayed on surroundings of the subject vehicle M.

FIG. 5 is a diagram showing an example of a state in which information is displayed in surroundings of the subject vehicle M. For example, in a case that the position of the subject vehicle M is in an area with high population density such as an urban area or a shopping mall, the surrounding environment recognition unit 135 is configured to determine that there are many people around the subject vehicle M. The "many people" means a state in which the number of people necessary for a rescue activity such as emergency measures for a rescue target can be secured. This determination may be changed according to a time. The surrounding environment recognition unit 135 may determine whether or not there are many people around the subject vehicle M on the basis of an image of the surrounding environment captured by the camera 10.

In a case that the rescue target is recognized by the rescue target recognition unit 134 and it is determined that there are many people around the subject vehicle M, the surrounding environment recognition unit 135 instructs the notification control unit 180 to send a notification to a predetermined agency such as a fire department or a police station and send a notification to the people around the subject vehicle M to ask for rescue. The surrounding environment recognition unit 135, for example, instructs the notification control unit 180 to cause a display image IM2 for requesting the rescue such as "Do rescue activity, please" to be displayed on the outside-vehicle display 92. The surrounding environment recognition unit 135, for example, may cause the outside-vehicle speaker 94 to output a voice message such as "Do rescue activity, please". In this case, the display image IM1 and the display image IM2 may be alternately displayed on the outside-vehicle display 92. These displays, including other display screens, may be sequentially displayed on the outside-vehicle display 92.

For example, in a case that the position of the subject vehicle M is in an area having a low population density such as a mountain area or a rural area, the surrounding environment recognition unit 135 determines that there are few people around the subject vehicle M. For example, in a case that the rescue target is recognized by the rescue target recognition unit 134 and it is determined that there are few people around the subject vehicle M, the surrounding environment recognition unit 135 instructs the notification control unit 180 to send a notification to a predetermined agency. Such a process of the surrounding environment recognition unit 135 is performed, for example, until the ambulance arrives. After the ambulance arrives, rescue is left to emergency personnel.

Figure 6:
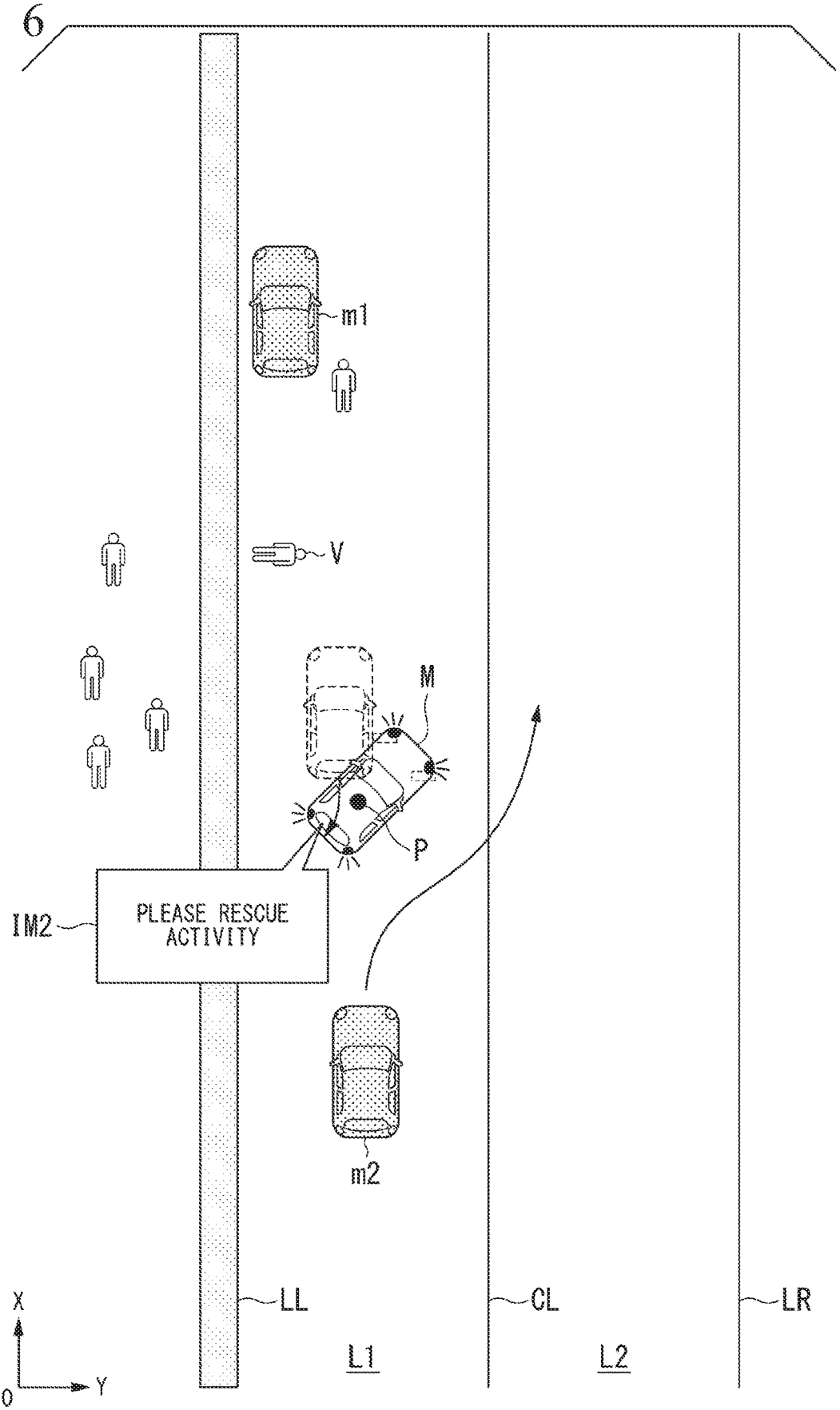
FIG. 6 is a diagram showing an example of a positional relationship between a rescue target V generated due to contact and the subject vehicle M.

FIG. 6 is a diagram showing an example of a positional relationship between the rescue target V generated due to a contact and the subject vehicle M. A contact target is, for example, a target in which a pedestrian or a human body in a light vehicle such as a bicycle, a two-wheeled vehicle, or the like is exposed. In the example of FIG. 6, it is assumed that the nearby vehicle m1 traveling in front contacts with a contact target such as a pedestrian and a sudden braking is stepped, such that the subject vehicle M cannot avoid the nearby vehicle m1 and contacts with the nearby vehicle m1. For example, in a case that the nearby vehicle m1 moves to a road shoulder and the rescue target due to the contact does not move on a V road, it is necessary to protect the rescue target. After the contact of the subject vehicle M has occurred, the evacuation driving control unit 141 controls one or both of steering and the acceleration/deceleration of the subject vehicle M, and evacuates the subject vehicle M to an area in which the subject vehicle M can be evacuated.

The evacuation driving control unit 141, for example, differentiates evacuation control that is executed in a case that it is recognized that the occupant is not onboard the subject vehicle M from evacuation control that is executed in a case that it is recognized that the occupant is onboard the subject vehicle M.

In a case that the contact is recognized and the rescue target V is recognized, the evacuation driving control unit 141 evacuates the subject vehicle M to the area in which the subject vehicle M can be evacuated, on the basis of the position of the rescue target V. In this case, the drive recorder 85 stores a situation from a time backward after a predetermined time since the occurrence of the contact to a time obtained by adding a predetermined time to a time in a case that the subject vehicle M is evacuated to the area in which the subject vehicle M can be evacuated and is stopped, in the storage unit 190, and performs evidence preservation. The evacuation driving control unit 141 provides data of the drive recorder 85 as evidence in a case that sending a notification to a predetermined agency such as a police station.

For example, in a case that the occupant is not onboard the subject vehicle M and the subject vehicle M can be self-propelling, the evacuation driving control unit 141 moves the subject vehicle M to the upstream side in a direction in which the other vehicle m traveling along the lane L1 in which the subject vehicle M travels flows from a position at which the contact occurs. That is, the evacuation driving control unit 141 moves the subject vehicle M to a predetermined position P at which the rescue target V can be protected from the other vehicle.

The predetermined position P at which the rescue target V can be protected is, for example, a position separated a predetermined distance from the position at which the rescue target V is staying due to the contact to the upstream side of the flow of the other vehicle. The evacuation driving control unit 141, for example, evacuates the subject vehicle M, secures a predetermined distance between the rescue target V and the subject vehicle M, and stops the subject vehicle M at the predetermined position P. The evacuation driving control unit 141 stops the subject vehicle M at an angle toward the center side of the road with respect to the direction in which the other vehicle flows, at the predetermined position P. By performing such a process, the evacuation driving control unit 141 can suppress the occurrence of secondary disasters.

The evacuation driving control unit 141 may stop the subject vehicle M at an angle in a direction in which the subject vehicle M can move in a direction in which the subject vehicle M is separated from the rescue target V at steered wheels at the predetermined position P. Accordingly, even in a case that a following vehicle collides with the subject vehicle M, the subject vehicle M moves to be separated from the rescue target V, and the rescue target V is protected. In this case, the evacuation driving control unit 141 instructs the notification control unit 180 to display the display image IM2 for requesting rescue or the display image IM1 for notifying of the contact on the outside-vehicle display 92.

For example, in a case that an occupant is onboard the subject vehicle M and the subject vehicle M can be self-propelling, the evacuation driving control unit 141 evacuates the subject vehicle M to an area in which the subject vehicle M does not obstruct traffics while avoiding the rescue target V.

In a case that an occupant is onboard the subject vehicle M, the occupant is obligated to rescue the rescue target V. Therefore, the evacuation driving control unit 141 first evacuates the subject vehicle M and then secures traffic of other vehicles. The evacuation driving control unit 141, for example, evacuates the subject vehicle M to a shoulder of a road while avoiding the rescue target V. After the subject vehicle M stops, the occupant installs a smoke cylinder or a triangular stop plate to alert following vehicles to call attention, and rescues the rescue target V. In this case, the evacuation driving control unit 141 may instruct the notification control unit 180 to display the display image IM2 for requesting rescue on the outside-vehicle display 92.

[Flow of Process]

Figure 7:
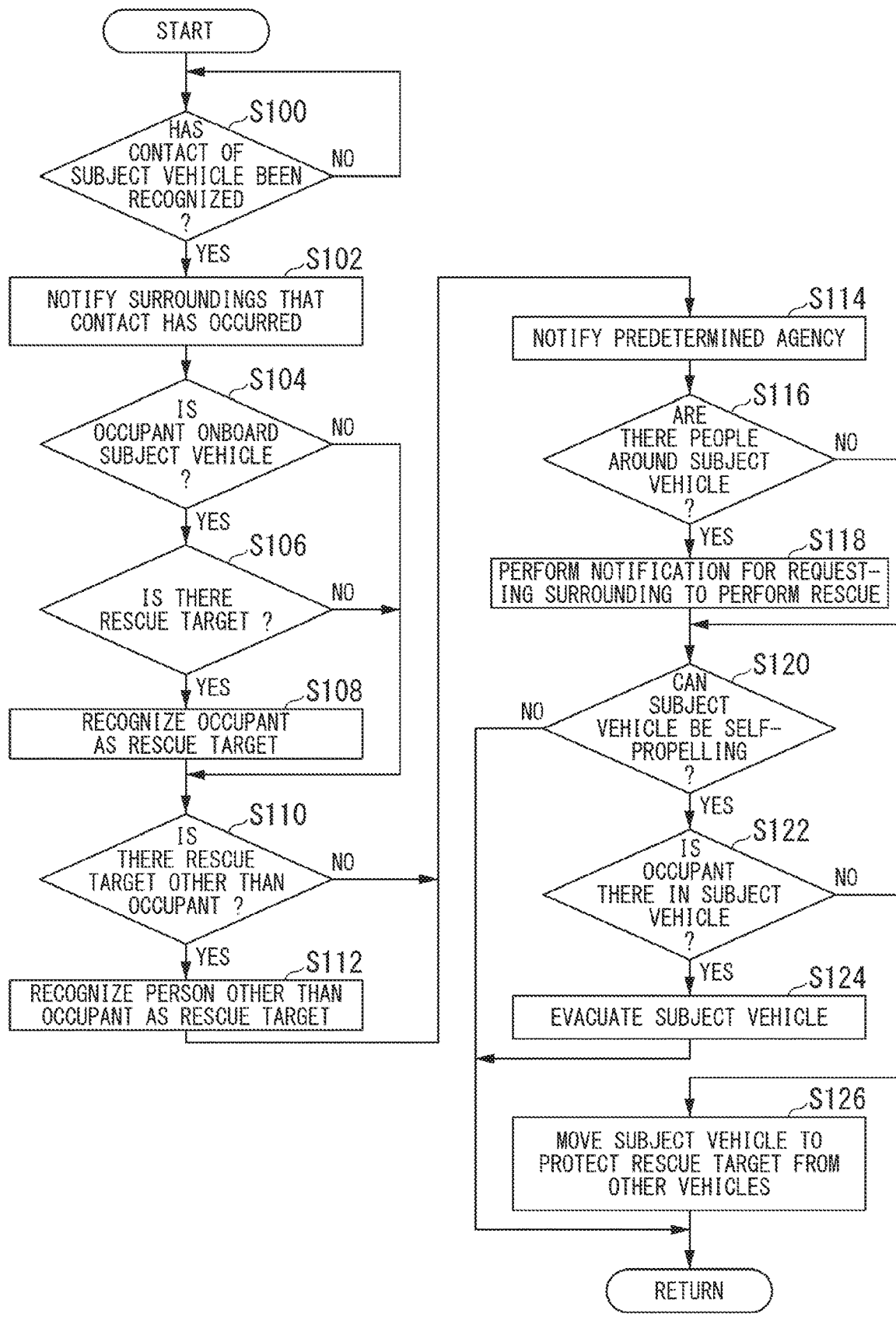
FIG. 7 is a flowchart showing a flow of a process that is executed by the automated driving control device 100 according to the embodiment.

FIG. 7 is a flowchart showing a flow of a process to be executed by the automated driving control device 100 of the embodiment. The process of this flowchart may be repeatedly executed at a predetermined cycle or predetermined timing, for example. At the time of start of this flowchart, it is assumed that a target trajectory is generated by the action plan generation unit 140, and automated driving control is executed by the second control unit 160 on the basis of the generated target trajectory.

The contact recognition unit 131 determines whether a contact of the subject vehicle M has occurred on the basis of a detection result of the vehicle sensor 40 (step S100). In a case that a positive determination is obtained in step S100, the contact recognition unit 131 instructs the notification control unit 180 to cause the outside-vehicle notification unit 90 to send a notification indicating that contact has occurred (step S102). Then, the occupant onboard determination unit 132 determines whether or not an occupant is onboard the subject vehicle M on the basis of output results of the in-vehicle camera 70 and the load sensor 75 (step S104).

In a case that a positive determination is obtained in step S104, the rescue target recognition unit 134 determines whether or not there is a rescue target among occupants on the basis of the output results of the in-vehicle camera 70 (step S106). In a case that a positive determination is obtained in step S106, the rescue target recognition unit 134 recognizes the occupant as a rescue target (step S108).

In a case that a negative determination is obtained in steps S104 and S106, the process proceeds to step S110.

The rescue target recognition unit 134 determines whether or not there is a rescue target among persons other than the occupant (step S110). In a case that a positive determination is obtained in step S110, the rescue target recognition unit 134 recognizes a person other than the occupant as the rescue target (step S112). The rescue target recognition unit 134 instructs the notification control unit 180 to send a notification to a predetermined agency via the communication device 20 and request rescue of the person recognized as the rescue target (step S114).

The surrounding environment recognition unit 135 determines whether or not there are many people around the subject vehicle M by referring to the position information of the navigation device 50 and the second map information 62 (step S116). In a case that a negative determination is obtained in step S112, the process proceeds to step S116. In a case that the positive determination is obtained in step S116, the surrounding environment recognition unit 135 instructs the notification control unit 180 to cause the outside-vehicle display 92 to perform a display for requesting rescue and to cause a notification for requesting the rescue to be performed from the outside-vehicle speaker 94 by voice (step S118).

Then, the self-propelling determination unit 133 checks an operation of the sensors, devices, and driving systems necessary for self-propelling, and determines whether or not the subject vehicle M can be self-propelling (step S120). In a case that a positive determination is obtained in step S120, the evacuation driving control unit 141 determines whether or not an occupant is onboard the subject vehicle M on the basis of the recognition result of the occupant onboard determination unit 132 (step S122).

In a case that a positive determination is obtained in step S122, the evacuation driving control unit 141 evacuates the subject vehicle M to an area in which the subject vehicle M does not interfere with traffics (step S124). In a case that a negative determination is obtained in step S122, the evacuation driving control unit 141 evacuates the subject vehicle M to a position at which the rescue target can be protected from other vehicles (step S126). Accordingly, the process of the flowchart ends. In a case that the negative determination is obtained in step S120, the process of the flowchart ends.

As described above, according to the automated driving control device 100 of the embodiment, in a case that an accident occurs during traveling, it is possible to perform appropriate control according to the presence or absence of an occupant. That is, in a case that a contact of the subject vehicle M occurs, the automated driving control device 100 can provide information to the surroundings of the subject vehicle M and sends a notification to a predetermined agency, thereby prompting action for rescuing the occupant. In this case, the automated driving control device 100 can prompt smooth passing of other traffics by providing information on traffic control to the other traffics. Furthermore, according to the automated driving control device 100, it is possible to suppress occurrence of secondary disasters by moving the subject vehicle M to a position at which the rescue target is protected.

<Hardware Configuration>

Figure 8:
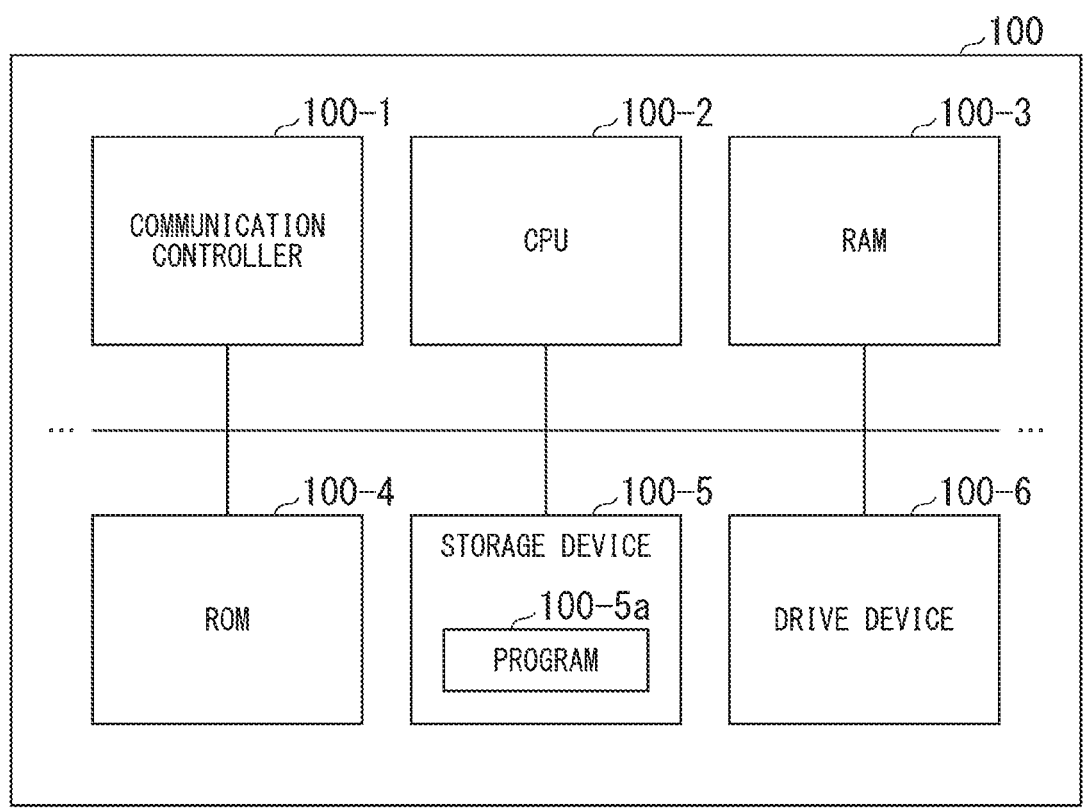
FIG. 8 is a diagram showing an example of a hardware configuration of an automated driving control device 100 according to the embodiment.

FIG. 8 is a diagram showing an example of a hardware configuration of the automated driving control device 100 according to the embodiment. As shown in FIG. 8, the automated driving control device 100 has a configuration in which a communication controller 100-1, a CPU 100-2, a random access memory (RAM) 100-3 that is used as a work memory, a read only memory (ROM) 100-4 that stores a boot program or the like, a storage device 100-5 such as a flash memory or a hard disc drive (HDD), a drive device 100-6, and the like are connected to each other by an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not shown) or the like and executed by the CPU 100-2. Accordingly, some or all of the contact recognition unit, the occupant onboard determination unit, the self-propelling determination unit, the rescue target recognition unit, the surrounding environment recognition unit, the evacuation driving control unit, and the notification control unit are realized.

The above-described embodiment can be represented as follows.

A vehicle control device including:
a storage device that stores a program, and
a hardware processor,
wherein the hardware processor is configured to
recognize a surrounding situation of a subject vehicle that is able to be automatically driven,
perform a predetermined operation with respect to a cause of obstruction to traffic of a traffic participant due to a predetermined contact of the subject vehicle in a case that it is recognized that the predetermined contact of the subject vehicle has occurred, and
differentiate an operation that is executed in a case that it is recognized that an occupant is not onboard the subject vehicle from an operation that is executed in a case that it is recognized that the occupant is onboard the subject vehicle, by executing the program stored in the storage device.

Although a mode for carrying out the present invention has been described above using the embodiment, the present invention is not limited to the embodiment at all, and various modifications and substitutions may be made without departing from the spirit of the present invention.

What is claimed is:
1. A vehicle control device comprising:
a processor; and
a memory that stores instructions that, when executed by the processor, facilitate performance of operations, comprising:
recognizing a surrounding situation of a subject vehicle that is able to be automatically driven;
performing a predetermined operation with respect to a cause of obstruction to traffic of a traffic participant due to a predetermined contact of the subject vehicle in response to recognizing that the predetermined contact of the subject vehicle has occurred;
differentiating an operation that is executed in response to recognizing that an occupant is not onboard the subject vehicle from an operation that is executed in response to recognizing that the occupant is onboard the subject vehicle;
determining whether or not the subject vehicle is able to be self-propelling based on a degree of contact;
controlling one or both of steering and accelerating/decelerating the subject vehicle;
moving the subject vehicle from a position of a rescue target generated due to the contact to an upstream side of a flow of another vehicle in response to recognizing that the occupant is not onboard the subject vehicle and it is determined that the subject vehicle is able to be self-propelling; and moving the subject vehicle to a position at which the rescue target due to the contact is able to be protected from other vehicles.

2. The vehicle control device according to claim 1, wherein the operations further comprising:
notifying information externally from the subject vehicle, wherein the information is information for requesting removal of the cause of the obstruction to traffic based on the surrounding situation.

3. The vehicle control device according to claim 2, wherein the operations further comprising sending a notification to a predetermined agency in response to recognizing that there are few people present around the subject vehicle, sending the notification to the predetermined agency in response to recognizing that there are many people around the subject vehicle, and notifying an outside of the subject vehicle of information for requesting removal of the cause of the obstruction to traffic.

4. The vehicle control device according to claim 2, wherein the operations further comprising
facilitating displaying, externally from the subject vehicle, the information on the cause of the obstruction to traffic on a display device.

5. A vehicle control method using an in-vehicle computer, comprising:
recognizing, by a vehicle control device, a surrounding situation of a subject vehicle that is able to be automatically driven;
performing, by the vehicle control device, a predetermined operation with respect to a cause of obstruction to traffic of a traffic participant due to a predetermined contact of the subject vehicle in response to recognizing that the predetermined contact of the subject vehicle has occurred;
differentiating, by the vehicle control device, an operation that is executed in response to recognizing that an occupant is not onboard the subject vehicle from an operation that is executed in response to recognizing that an occupant is onboard the subject vehicle;
determining whether or not the subject vehicle is able to be self-propelling based on a degree of contact;
controlling one or both of steering and acceleration/deceleration of the subject vehicle;
moving the subject vehicle from a position of a rescue target generated due to the contact to an upstream side of a flow of another vehicle in response to recognizing that an occupant is not onboard the subject vehicle and determining that the subject vehicle is able to be self-propelling; and
moving the subject vehicle to a position at which the rescue target due to the contact is able to be protected from other vehicles.

6. A non-transitory computer-readable medium storing a program, the program causing a vehicle control device to
recognize a surrounding situation of a subject vehicle that is able to be automatically driven;
perform a predetermined operation with respect to a cause of obstruction to traffic of a traffic participant due to a predetermined contact of the subject vehicle in response to recognizing that the predetermined contact of the subject vehicle has occurred;
differentiate an operation that is executed in response to recognizing that an occupant is not onboard the subject vehicle from an operation that is executed in response to recognizing that an occupant is onboard the subject vehicle;
determine whether or not the subject vehicle is able to be self-propelling based on a degree of contact;
control one or both of steering and acceleration/deceleration of the subject vehicle;
move the subject vehicle from a position of a rescue target generated due to the contact to an upstream side of a flow of another vehicle in response to recognizing that an occupant is not onboard the subject vehicle and determining that the subject vehicle is able to be self-propelling; and
move the subject vehicle to a position at which the rescue target due to the contact is able to be protected from other vehicles.

* * * * *